(12) United States Patent
Gatten

(10) Patent No.: US 11,543,246 B1
(45) Date of Patent: Jan. 3, 2023

(54) REAR AXLE CENTER LOCATING

(71) Applicant: Zimeno, Inc., Livermore, CA (US)

(72) Inventor: Benjamin M. Gatten, Dublin, CA (US)

(73) Assignee: Zimeno, Inc., Livermore, CA (US)

( * ) Notice: Subject to any disclaimer, the term of this patent is extended or adjusted under 35 U.S.C. 154(b) by 0 days.

(21) Appl. No.: 17/489,198

(22) Filed: Sep. 29, 2021

(51) Int. Cl.
*G01C 21/16* (2006.01)
(52) U.S. Cl.
CPC .................................. *G01C 21/165* (2013.01)
(58) Field of Classification Search
CPC ....................................................... G01C 21/165
See application file for complete search history.

(56) References Cited

U.S. PATENT DOCUMENTS

| | | | |
|---|---|---|---|
| 7,065,440 B2* | 6/2006 | Aral | G01C 21/20 |
| | | | 701/41 |
| 8,265,826 B2 | 9/2012 | Feller et al. | |
| 8,275,516 B2* | 9/2012 | Murphy | B60W 50/14 |
| | | | 701/124 |
| 8,359,141 B1* | 1/2013 | Lange | G05D 1/0278 |
| | | | 172/313 |
| 8,639,416 B2 | 1/2014 | Jones et al. | |
| 9,002,565 B2 | 4/2015 | Jones et al. | |
| 9,038,755 B2* | 5/2015 | Sedoni | H01M 8/00 |
| | | | 180/65.245 |
| 9,141,111 B2 | 9/2015 | Webber et al. | |
| 9,389,615 B2 | 7/2016 | Webber et al. | |
| 10,168,714 B2 | 1/2019 | Webber et al. | |
| 10,241,215 B2 | 3/2019 | Medagoda et al. | |
| 10,512,204 B1* | 12/2019 | Gunbatar | A01B 69/004 |
| 2020/0039523 A1* | 2/2020 | Ghasemalizadeh | B62D 6/003 |
| 2021/0116914 A1 | 4/2021 | Ren et al. | |

FOREIGN PATENT DOCUMENTS

| | | |
|---|---|---|
| AU | 2016259362 | 8/2021 |
| CN | 105987696 | 10/2016 |
| CN | 108289408 | 7/2018 |
| CN | 108438048 | 5/2021 |
| EP | 3171134 | 12/2019 |
| KR | 20170037404 | 4/2017 |
| KR | 20180098525 | 9/2018 |
| WO | WO2021073165 | 4/2021 |

* cited by examiner

*Primary Examiner* — Mischita L Henson
(74) *Attorney, Agent, or Firm* — Rathe Lindenbaum LLP

(57) ABSTRACT

A rear axle center (RAC) locating system may include a tractor and a RAC location acquisition unit. The tractor may include a rear axle having a center, a global positioning system (GPS) antenna offset from the rear axle, and inertial measurement units. The RAC location acquisition unit may include a processing unit and a non-transitory computer-readable medium containing instructions to direct the processing unit to determine a geographic location of the GPS antenna based upon signals received by the GPS antenna and determine a geographic location of the center of the rear axle based upon the geographic location of the GPS antenna and combined data from the inertial measurement units.

19 Claims, 5 Drawing Sheets

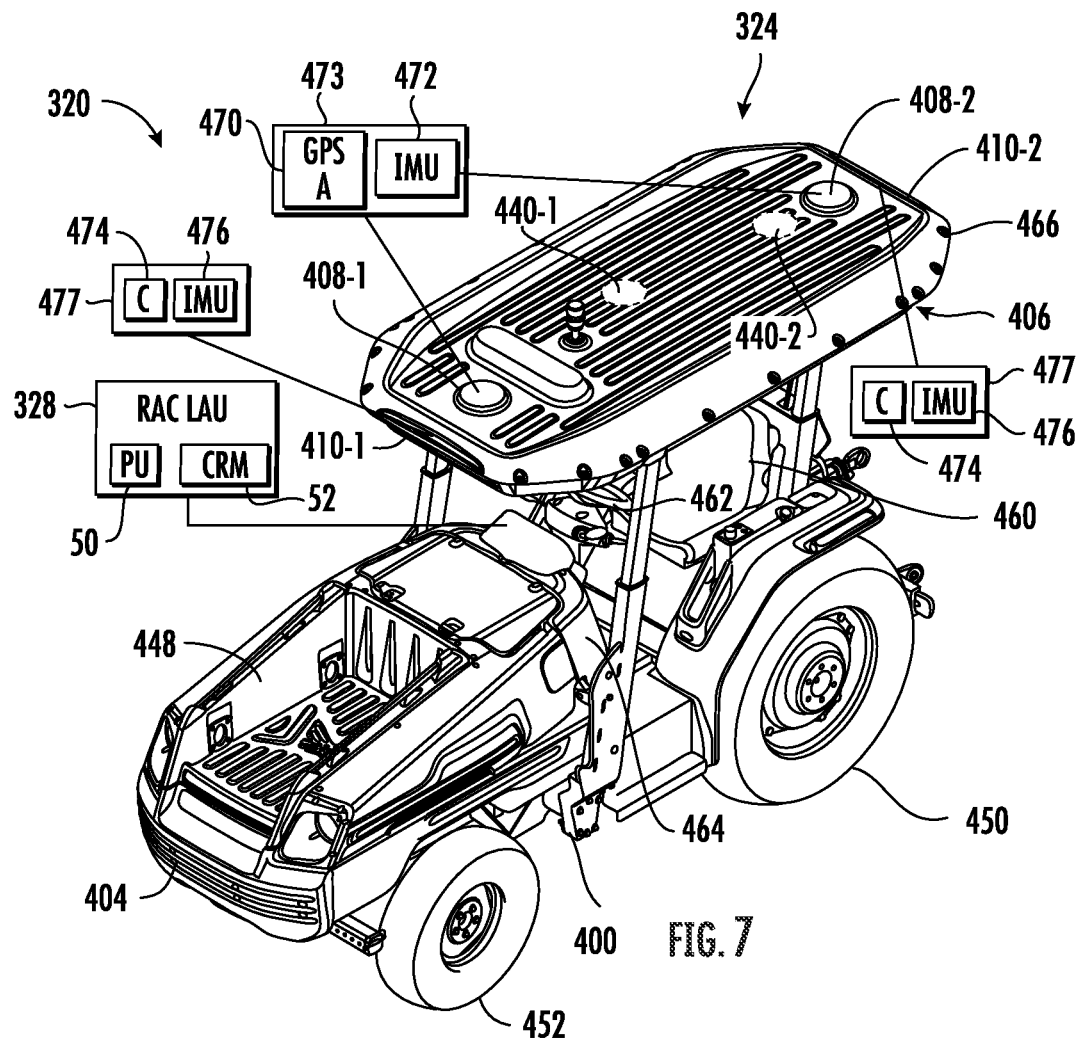

$$^{MAP}T_{GPS} = \begin{bmatrix} & R & & X \\ & & & Y \\ & & & Z \\ 0 & 0 & 0 & 1 \end{bmatrix}$$

REAR AXLE CENTER LOCATING

BACKGROUND

Tractors are frequently used to carry, push and/or pull attachments and implements when carrying out various tasks. Global positioning systems, also known as global navigation satellite systems, are sometimes used to determine a geo-referenced location of the tractor (and any attachments or implements) when traversing a field, construction site or other landscape.

BRIEF DESCRIPTION OF THE DRAWINGS

FIG. 7 is a top perspective view of an example RAC location acquisition system including an example tractor.

FIG. 8 is a bottom view of the example tractor of the example RAC location acquisition system of FIG. 5.

Figure 1:
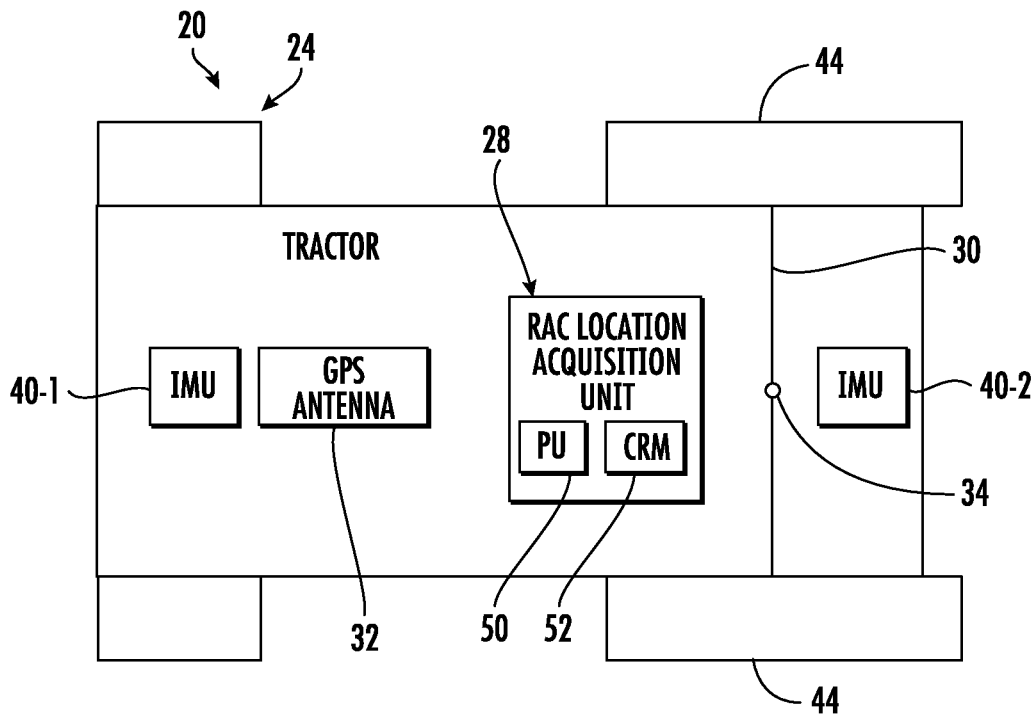
FIG. 1 is a block diagram illustrating portions of an example rear axle center (RAC) location system.

Throughout the drawings, identical reference numbers designate similar, but not necessarily identical, elements. The figures are not necessarily to scale, and the size of some parts may be exaggerated to more clearly illustrate the example shown, Moreover, the drawings provide examples and/or implementations consistent with the description; however, the description is not limited to the examples and/or implementations provided in the drawings.

DETAILED DESCRIPTION OF EXAMPLES

Disclosed are example tractors, computer-readable mediums and methods that may facilitate more accurate and lower cost tractor positioning estimates. Global positioning system (GPS) signals are often acquired by the tractor using a GPS antenna. To enhance signal reception, such GPS antenna may be located or supported by the roof of the tractor. Although the GPS antenna is located on the roof of the tractor, the positioning of the tractor may be in terms of the base link, the center of the rear axle of the tractor. To address this offset of the GPS antenna and the base link, any determined position of the GPS antenna is translated to the position of the base link. Such a translation may encounter difficulty due to the GPS antenna being located on the roof of the tractor, where vibration, roll and pitch may be exacerbated.

The example tractors, computer-readable mediums and methods determine a current roll and pitch of the tractor and utilize the determined roll and pitch to translate the determined position of the GPS antenna to the determined position of the base link. The example tractors, computer-readable mediums and methods determine the roll and pitch of the tractor by utilizing multiple inertial measurement units and combining the data from the multiple inertial measurement units. As a result, lower fidelity and lower cost inertial measurement units may be utilized for determining the roll and the pitch of the tractor. In some implementations, the data is combined using a Kalman type filter, such as an extended Kalman filter.

To further reduce cost, the example tractors, computerized readable mediums and methods utilize existing inertial measurement units of a camera or cameras. Such cameras may be located in the roof of the tractor for better image capturing angles or perspectives. To also reduce cost, the example tractors, computerized readable mediums and methods utilize inertial measurement units provided as part of GPS units that provide the GPS antenna or antennas. Such GPS units may also be supported by the roof of the tractor. Although the individual inertial measurement units provided in such cameras and GPS units may not provide satisfactory roll and pitch measurements, especially given the vibration which may occur on the roof of the tractor, the combination of data from the multiple individual inertial measurement units offers enhanced roll and pitch accuracy to facilitate better position estimates for the tractor.

In some implementations, a trust level for the inertial measurement units is evaluated, The trust level may depend upon various factors such as the extent or degree of vibration being experienced by the roof of the tractor or by the inertial measurement sensors. A high level of vibration may result in less accurate sensor readings from the inertial measurement units. In some implementations, the level of vibration is detected using the inertial measurement sensors themselves, In other implementations, level of vibration may be determined using additional sensors. In circumstances where the trust level for the data received from the inertial measurement units is less than a predefined threshold, such as when the sensed level of vibration exceeds a predetermined threshold, the data from the inertial measurement units may be provided with a lower weighting (relied upon to a lesser extent) when determining roll and pitch or may be ignored.

In some implementations, the geographic location of the RAC is in terms of the longitudinal and latitudinal coordinates of the RAC. In some implementations, the geographic location of the RAC may additionally include a heading of the vehicle, heading up the RAC. In some implementations, this heading may be determined using multiple GPS antennas, fore and aft, to determine the orientation or heading (yaw) of the RAC.

Once the position of the tractor has been determined, the example tractors, computerized readable mediums and methods may utilize the previously determined tractor position and signals from wheel encoders, indicating the speed and yaw rate or yaw (steering) of the tractor wheels, to determine a new position of the tractor. Such position estimates may be made in the absence of GPS signals, such as where and when GPS signals are not able to be acquired. Once the position of the tractor has been determined, its position may be utilized to control steering of the wheels and of the tractor through a field, between plant rows or over a terrain. Such steering control may be carried out in an automated fashion using a processor that follows instructions found on a non-transitory computer-readable medium.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

FIG. 1 is a schematic diagram illustrating portions of an example rear axle center (RAC) locating system 20. RAC locating system 20 determines a geographic location of a center of the rear axle of a tractor based upon the geographic location of a GPS antenna, an offset of the GPS antenna relative to the center of the rear axle, and roll and pitch of the tractor as determined from a combination of multiple inertial measurement units. By compensating for roll and pitch of the tractor, a more accurate translation of the GPS antenna location to the RAC location may be achieved. By determining roll and pitch using signals from a combination of multiple inertial measurement units, accurate roll and pitch values may be achieved at a lower cost. RAC locating system 20 comprises tractor 24 and RAC location acquisition unit 28.

Tractor 24 comprises a vehicle configured to carry, push and/or pull attachments and implements when carrying out various tasks. Tractor 24 may be employed in various settings such as an agricultural setting, a residential setting, or in a construction setting. Tractor 24 comprises rear axle 30, GPS antenna 32 and inertial measurement units (IMUs) 40-1 and 40-2, collectively referred to as IMUs 40.

Rear axle 30 comprises a rod or shaft (or multiple rods or shafts) that conducts power to propel tractor 24. For some implementations, the rear axle may be part of an assembly that includes a differential. Rear axle 30 comprises a center, rear axle center (RAC) 42 that serves as a base link or origin for identifying the geographic positioning or location of tractor 24. The positioning of other components of tractor 24 as well as any attachments or implements being carried, pushed or pulled by tractor 24 may be defined in terms of this base link, the RAC 42 of tractor 24. Although rear axle 30 is illustrated as transmitting or conducting power to wheels or tires 44, in some implementations, rear axle 30 may transmit or conduct power to wheels of a belt or track drive of tractor 24.

GPS antenna 32 comprises a device to receive and expand radio signals sent by distinct frequencies from a GPS or GNS system. The signals are converted into electronic signals that are used by a GPS receiver to determine the geographic location, such as longitudinal and latitudinal coordinates, of the GPS antenna 32. GPS antenna 32 is physically spaced from or offset from RAC 42. In some implementations, the positioning of GPS antenna 32 may be in accordance with structural constraints of tractor 24 and available space of tractor 24. In some implementations, the positioning of GPS antenna 32 may be to enhance signal reception quality or to protect the GPS antenna 32. In some implementations, GPS antenna 32 may be supported or mounted upon a roof or other top surface of tractor 24 to enhance signal reception.

Inertial measurement units 40 comprises electronic devices that measure and report angular rate of movement, force and orientation of a body, Such inertial measurement units 40 may utilize a combination of accelerometers, gyroscopes and/or magnetometers. Inertial measurement units 40 may be used to calculate altitude, angular rates, linear velocity and position relative to a global reference frame. In the example illustrated, tractor 24 comprises two IMUs 40-1 and 40-2 which are physically spaced from one another. In the example illustrated, IMUs 40 are positioned in close proximity to GPS antenna 32 to evaluate roll and pitch in regions proximate to GPS antenna 32. In the example illustrated, IMU 40-1 is positioned close to GPS antenna 32, forward of RAC 42, while NU 40-2 is positioned rearward of RAC 42. In the example, both IMUs 40 are positioned within generally the same horizontal plane above RAC 42 as GPS antenna 32. Although tractor 24 is illustrated as comprising two IMUs 40, in some implementations, tractor 24 may include greater than two IMUs.

RAC location acquisition unit 28 determines the position of RAC 42 of tractor 24, wherein the position may be utilized to drive or steer tractor 24 and to control the positioning or operation of various attachments, and/or implements associate with tractor 24. In the example illustrated, unit 28 is mounted to, carried by are provided as part of tractor 24. In such an implementation, unit 28 may include a processing unit and a non-transfer accumulation readable medium that are not only used to determine the RAC location but also used for other functions of tractor 24. For example, unit 28 may be utilized to additionally control steering of vehicle 20 and/or to control the use and operation of various attachments and implements carried or moved by vehicle 20. In some implementations, unit 28 may be remote from tractor 24, wherein unit 28 is cloud-based or is in wireless communication with tractor 24. Some limitations, RAC location acquisition unit 28 may comprise processing unit and/or storage mediums 52 across various componentry and locations and connected to one another in a wireless fashion. RAC location acquisition unit 28 comprises processing unit 50 and non-transitory computer-readable medium 52. Processing unit 50 carries out functions or operations in accordance with instructions provided on computer-readable medium 52.

Figure 2:
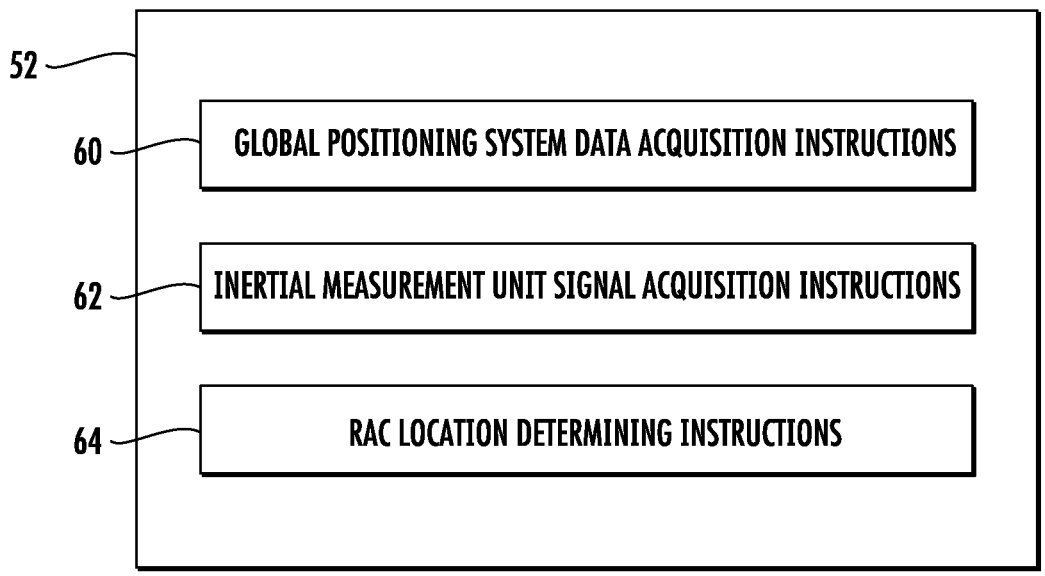
FIG. 2 is a block diagram illustrating portions of an example non-transitory computer-readable medium of an example RAC location acquisition unit.

Non-transitory computer-readable medium 52 comprise a persistent storage device storing recorded instructions for processing unit 50. Examples of medium 52 include, but are not limited to, solid-state memory (flash memory), disk memory and the like. As shown by FIG. 2, medium 52 comprises global positioning system data acquisitions instructions 60, inertial measurement unit signal acquisition instructions 62 and RAC location determining instruction 64. Instructions 60-64 direct processing unit 50 to carry out method 100 outlined in FIG. 3.

Figure 3:
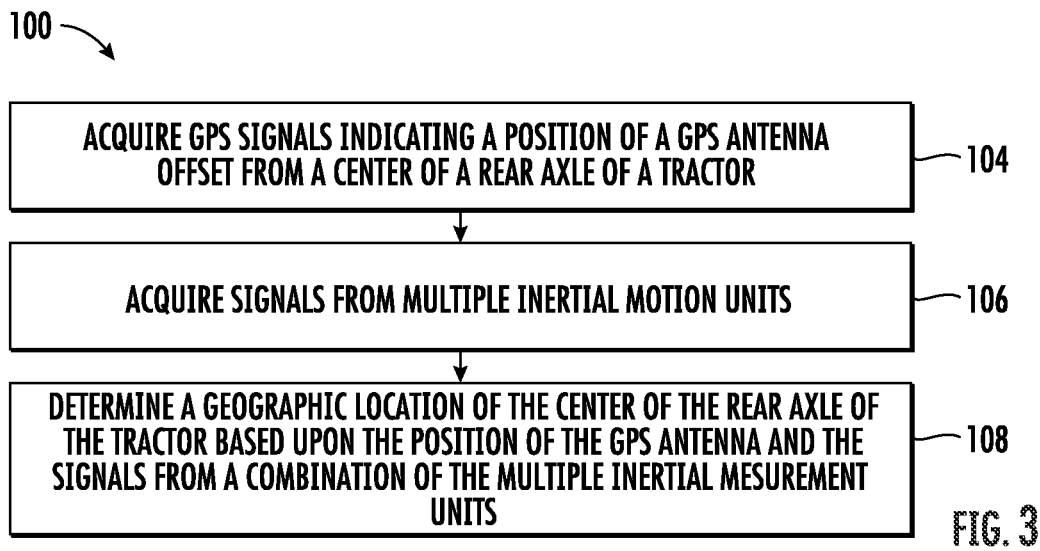
FIG. 3 is a flow diagram illustrating portions of an example RAC location acquisition method.

As indicated by block 104 in FIG. 3, global positioning system data acquisition directions direct processing unit 50 to acquire GPS signals from GPS antenna 32, wherein the GPS signals indicate a geographic location of the GPS antenna 32 which is offset from RAC 34 of tractor 24.

As indicated by block 106 in FIG. 3, inertial measurement unit signal acquisition instructions 62 direct processing unit 50 to acquire signals from multiple inertial measurement units, such as inertial measurement units 40-1 and 40-2 of tractor 24.

As indicated by block 108 in FIG. 3, RAC location determining instruction 64 direct processing unit 50 to determine a geographic location of the center 34 of the rear axle 30 based upon the determined position of the GPS antenna 32, as indicated from the GPS signals acquired in block 104, and from a combination of the signals from the multiple IMUs 40. In some implementations, the signals from the multiple IMUs 40 are combined to determine a roll and a pitch of tractor 24 which is used as a basis for translating the position of GPS antenna 32 to the position or location of RAC 34. In some implementations, the positioning of antenna 32, is offset relative to RAC 34, wherein the offset and the determined roll and pitch of tractor 24 are used in combination to estimate the location of RAC 34 (its longitudinal and latitudinal coordinates or other geographic location identification parameters). In some implementations, the signals from the multiple IMUs are combined using a Kalman filter. In some implementations, the Kalman filter is an extended Kalman filter.

Once the geographic location of the RAC 34 has been determined, the determine geographic location/position of RAC 34 may be used as a basis to control steering of the wheels 44 and of the tractor 24 through a field, between plant rows or over a terrain. Such steering control may be carried out in an automated fashion using a processor that follows instructions found on a non-transitory computer-readable medium 52. In some implementations, two different estimates for the geographic location/position of RAC 34 at two different times may be used to estimate the speed and/or velocity of tractor 24 and of RAC 34. In some implementations, the determined geographic location of RAC 34 may also be utilized by an operator or an automated control system to control the positioning or operation of various attachments, and/or implements associate with tractor 24.

Figure 4:
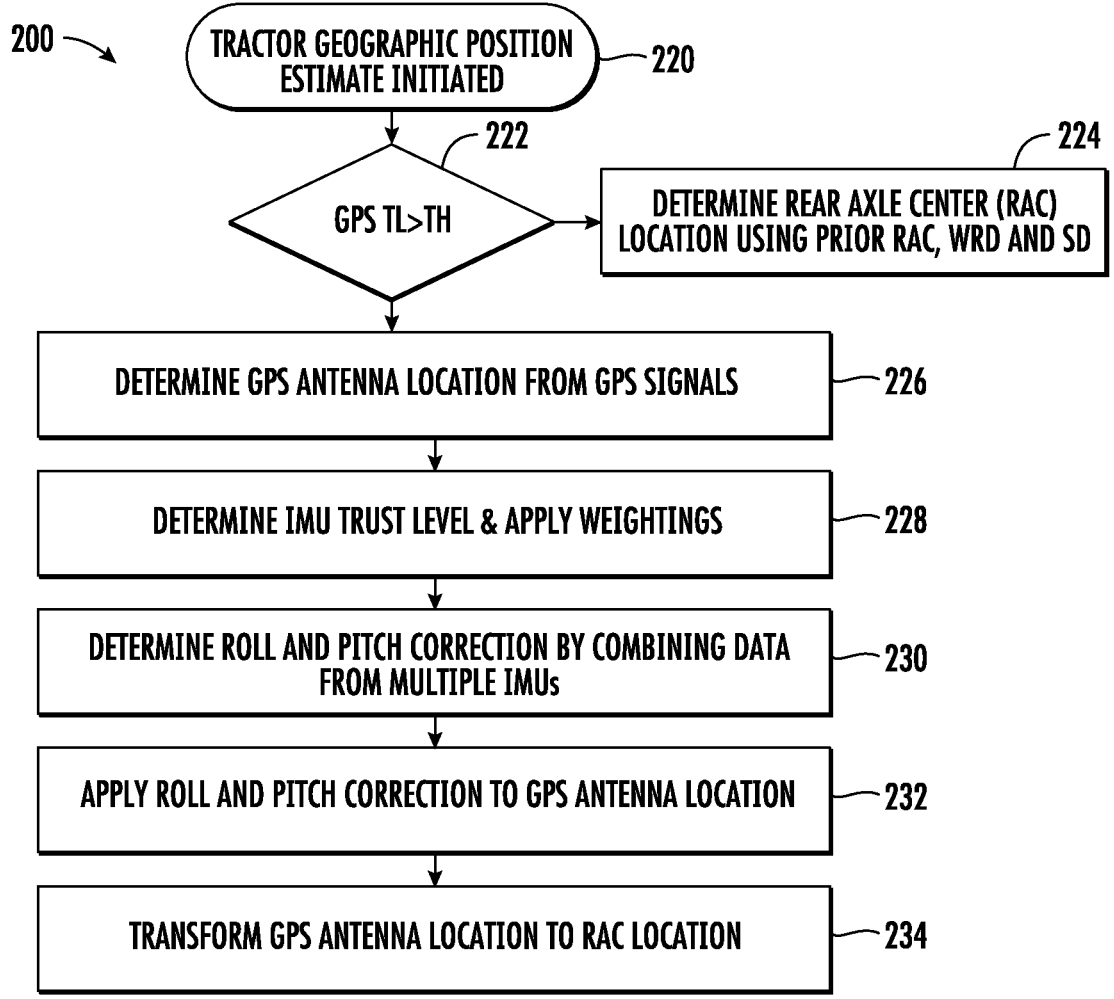
FIG. 4 is a flow diagram illustrating portions of an example RAC location acquisition method.

In some circumstances, GPS signals indicating the position of GPS antenna 32 may not be available. In some circumstances, vibration or other conditions may impair the reliability and accuracy of the signals from IMUS 40. FIG. 4 is a flow diagram of an example method 200 for locating RAC 34 and the positioning of tractor 24. Although method 200 is described in the context of being carried out by tractor 24, it should be appreciated that method 200 may likewise be carried out by other similar vehicles or other similar tractors.

As indicated by block 220, the rear axle center (RAC) location estimate is initiated. In some implementations, the determination of the RAC location may be initiated (and repeated in a periodic fashion (i.e., every X seconds) until termination) in response to input from an operator, either an operator riding or driving tractor 24 or a remote operator. In some implementations, the determination of the RAC location may be initiated according to a predetermined pattern. For example, the RAC location may be initiated periodically based on time or periodically based upon distance traversed by the tractor.

In some implementations, the determination of the RAC location may be automatically triggered in response to certain conditions or certain operations being carried out or to be carried out by tractor 24 or by any attachments/implements moved by tractor 24. In some implementations, the RAC location estimation process may be triggered automatically in response to tractor 24 or unit 28 receiving signals from a sensor or commands from an operator or automated program indicating that a particular implement operation is about to begin. For example, in circumstances where the precise positioning of tractor 24 is beneficial, such as the initiation of planting, spraying a chemical or fertilizer, applying a fertilizer, cultivation, performing a pruning operation, harvesting a crop, or the Ike, the RAC location estimation process may be initiated. The process may be repeated or continued until the circumstances that demand the precise positioning of tractor 24 have expired. In some implementations, the RAC location estimate may be initiated and may continue to be carried out in a periodic fashion (i.e., every X seconds) while tractor 24 is being used or operated.

As indicated by decision block 222, processing unit 50, following instructions in non-transitory computer-readable medium 52, may determine the current GPS trust level for the signals received from GPS antenna 32. The GPS trust level is a measure of the current accuracy and/or reliability of the location indication provided by the signals received by GPS antenna 32. In some circumstances, the signals may be intermittent so as to be less reliable. In some circumstances, GPS antenna 32 may not be receiving any location indicating signals or an insufficient number of signals to accurately determine a location.

As indicated by block 224, in circumstances where the GPS trust level (GPS TL) fails to satisfy the predetermined threshold TH1, such as when the reception of a GPS signal is obstructed or is not being received due to a distance from a GPS signal source, instructions 64 may direct processing unit 50 to determine or estimate geographic location of RAC 34 using data other than the GPS signal. In some implementations, processing unit 50 may determine or estimate the current geographic location of RAC 34 based upon a prior determined and stored RAC estimate, subsequent wheel rotation data and subsequent steering data. In such circumstances, the wheel rotation data may be obtained by processing unit 50 from a wheel encoder or multiple wheel encoders that sense the speed at which wheels 44 have been driven since the last determined RAC position, wherein the duration of time at the various speeds indicates a distance traveled, The steering data may be obtained by processing unit 50 from a potentiometer, IMU 40-1 and/or IMU 40-2. The steering data may indicate the direction of travel of tractor 24 at the various speed or speeds.

As indicated by decision block 226, in circumstances where the GPS signal is being received and is reliable, instructions 62 may direct processing unit 50 to determine the GPS antenna location from the GPS signals received by GPS antenna 32.

As indicated by block 228, instructions 52 may direct processing unit 50 to determine the current trust level for the signals received from IMUS 40. The IMU trust level is a measure of the current accuracy and/or reliability of the roll and pitch indications provided by the output by IMUS 40. In circumstances where IMUS are experiencing high levels of vibration, the ability of the signals output by IMUS 40 to accurately and/or reliably indicate roll and/or pitch of the vehicle may be impaired. Such vibration measurements may be taken by one or more vibration sensors provided on tractor 24. In some implementations, one of IMUS may be experiencing a higher degree of vibration or bouncing as compared to the other of IMUS 40. In such circumstances, a lower weighting may be applied to the signals from the particular IMU experiencing the larger vibrations when determining roll and pitch correction values. For example, in some implementations, an IMUS covariance matrix (trust) may be dynamically updated based upon the magnitude of acceleration (vibration) as sensed by the particular IMU at any given time.

As indicated by block 230, following the instructions contained in medium 52, processing unit 50 determines roll and pitch corrections using the data or signals from the multiple IMUs 40. Roll refers to movement of tractor 24 about a longitudinal axis rotational axis of wheels 44. Pitch refers to movement of tractor 24 about a transverse axis parallel to the rotational axis of wheels 44. Yaw refers to movement or orientation of tractor 24 about a vertical axis. Each of such movements may further impact the geographic location of GPS antenna 32 relative to RAC 34. The determined correction constitutes a vector (distance and direction) value indicating the additional amount of movement of GPS antenna 32 towards or away from RAC 34 caused by such yaw, roll and/or pitch.

In some implementations, the different signals from the multiple different IMUs are combined to determine the roll and pitch correction. In some implementations, the different signals for the multiple different IMUs are combined using sensor and data fusion such as with a Kalman filter. In some implementations, the signal or data from the different IMUs are combined using an extended Kalman filter. The extended Kalman filter uses a series of measures observed over time, including statistical noise and other inaccuracies to produce estimates. The extended Kalman filter includes a prediction phase wherein the filter produce estimates of current state variables along with their uncertainties. The extended Kalman filter relies on the covariance (confidence) from the current measurement and state. In this way it indirectly uses the measurements from the previous states, but previous measurements are not directly fed into the filter at the new update step. The extended Kalman filter operates in real time using present input measurements and prior measurements.

Figure 6:
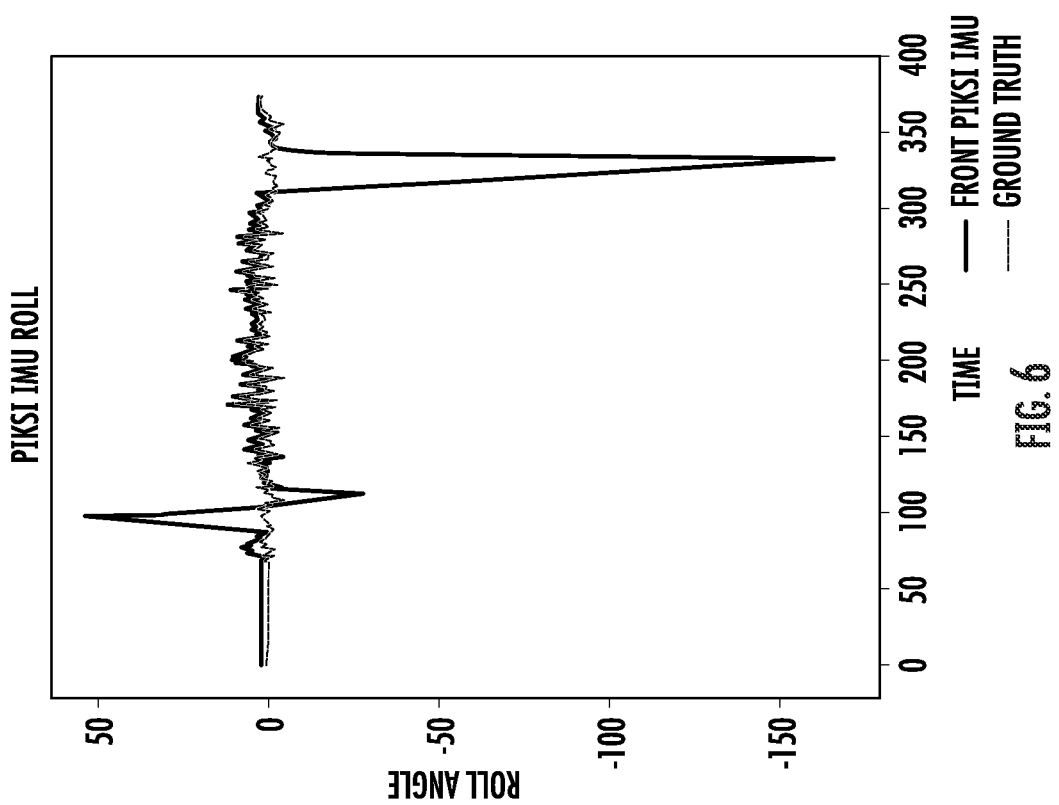
FIG. 6 is a graph depicting example roll measurements over time from the high cost IMU sensor and from combined measurements from multiple low-cost IMU sensors on the tractor
Figure 5:
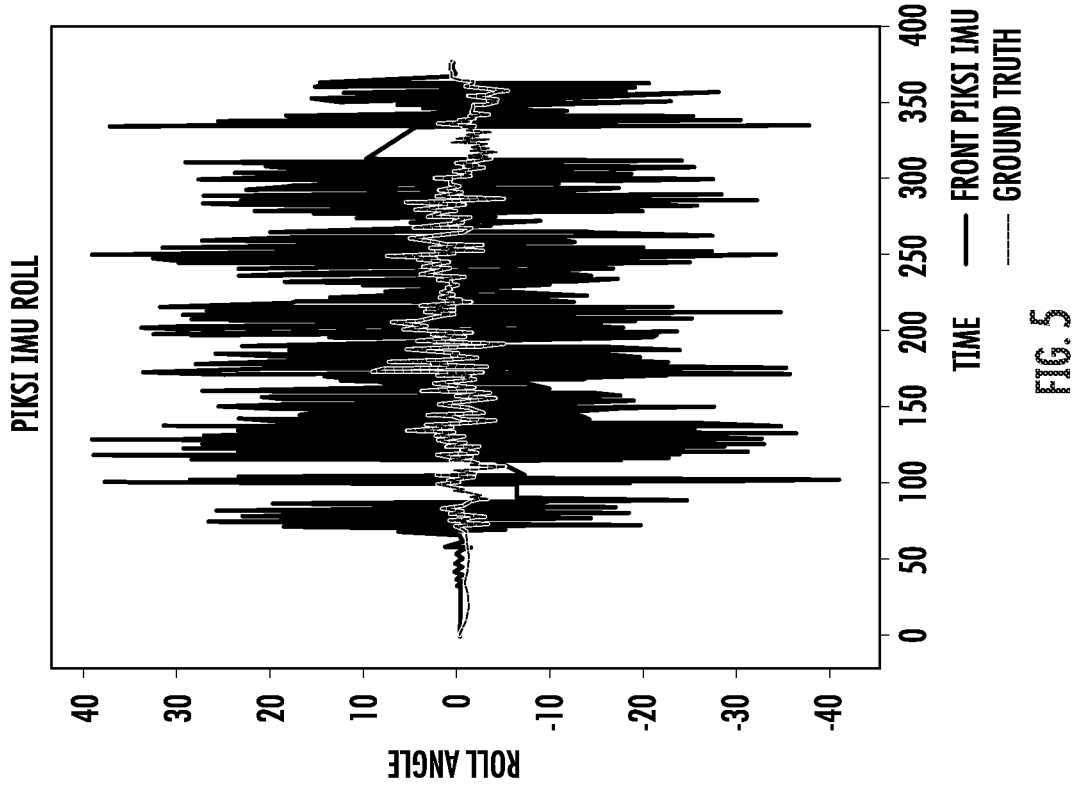
FIG. 5 is a graph depicting example roll measurements over time from a high cost IMU sensor and a low cost IMU sensor on a tractor.

FIG. 5 is a graph illustrating a comparison of two example vehicle roll estimations over time from two different single IMUs. The comparison depicts signals from a low cost Bosch IMU that comes with a Piksi multi GPS board (shown in red) and a high cost XSENS IMU (shown in blue). FIG. 6 is a graph illustrating a comparison of roll estimations over time from a combination of multiple low cost Bosch IMUs (using an extended Kalman filter) and from a high cost XSENS IMU (shown in blue). As shown by FIG. 6, by combining or fusing the signals or data from multiple low-cost IMUs, roll estimate accuracy similar to those of a single high cost IMU may be achieved. Similar results are achieved when estimating pitch of a vehicle by fusing signals from multiple low-IMUs. Because low-cost IMUs maybe drastically less expensive than high cost IMUs and because low-cost time use may already exist on other componentry, such as with GPS units camera units and the like, roll and pitch estimates may be made with existing componentry and such are without higher cost IMUs.

As indicated by block 232, processing unit 50, following the instructions contained in medium 52, applies a roll and pitch corrections to the GPS antenna location.

As indicated by block 234, processor unit 50, following instructions contained in medium 52, transforms the GPS location (as corrected based upon roll and pitch) to the RAC location. This transformation may be based upon the offset (direction and distance) between the GPS antenna and the RAC 34. The offset maybe in terms of the relative physical positioning of the RAC 34 and the GPS antenna 32 due to the mounting locations on tractor 24.

In some implementations, processing unit 50 may begin with the GPS signal determined position of the GPS antenna and then adjust this location based upon both the roll and pitch correction and the offset to derive the geographic location of RAC 34. The geographic location of RAC 34 may then be stored and/or used to control the steering and movement of tractor 24, to control the positioning and/or operation of implement or attachments of tractor 24 and/or to map the geographic locations of information regarding plants, moisture level, weeds, conditions or other parameters sensed by sensors or cameras of tractor 24 as tractor 24 moves in a field, orchard or the like.

FIGS. 7 and 8 illustrate an example RAC locating system 320. System 320 is similar to system 20 described above in that system 320 determines a current roll and pitch of a tractor using the combined signals from multiple IMUs to translate the determined position of the GPS antenna to the determined position of the base link, the RAC. FIGS. 7 and 8 illustrate a specific implementation of system 20, wherein some of the IMUs used to determine roll and pitch are provided by existing GPS units and existing camera units. FIGS. 7 and 8 illustrate an example RAC locating system that may be at a lower cost as compared to other systems that utilize higher fidelity IMUs or IMUs dedicated to determining roll and pitch. System 320 comprises tractor 324 and RAC location acquisition unit 328.

Tractor 324 comprises a vehicle that may be employed in various settings such as an agricultural setting, a residential setting or a construction setting. Tractor 324 may be used for a variety of purposes in agricultural construction and residential purposes. Tractor 324 may be used to push or pull an implement. Tractor 324 may include attachments, such as a bucket, blade, backhoe, or the like for digging, displacing, and/or carrying various materials such as earthen materials, animal waste and produce. Tractor 324 may include forks or other coupling mechanisms for engaging pallets, bins, boxes, or the like, wherein the tractors carry and/or lift the engaged items.

Tractor 324 comprises chassis 400, ground propulsion members 402, battery 404, vehicle cab 406, GPS units 408-1 and 408-1 (collectively referred to as GPS units 408), camera units 410-1, 410-2 (collectively referred to as camera units 410), IMUs 440-1, 440-2 (collectively referred to as IMUs 440), front wheel encoders 442, rear wheel encoders 444 and steering actuator 446.

Chassis 400 comprises a frame supporting the remaining components of tractor 324. In the example illustrated, chassis 400 comprises a front cargo bed 448 for storing and transporting cargo. In the example illustrated, chassis 400 is further configured for connection to an attachment/implement with a hitch or other mounting structure. In the example illustrated, chassis 400 supports a propulsion unit in the form of an an electric motor driven by electrical power supplied by battery 404.

Ground propulsion members 402 comprise members that engage the underlying terrain and which are driven. In the example illustrated, ground propulsion members 402 comprise rear wheels 450 and front wheels 452. In the example illustrated, rear wheels 450 are driven by an electrical drive while front wheels 452 are manipulated or turned by steering actuator. In other implementations, ground propulsion members 402 may comprise tracks or other ground engaging members.

As shown by FIG. 6, rear wheels 450 are supported by an/or driven by a rear axle 454 having a rear axle center (RAC) 456. RAC 456 serves as a base link or origin for identifying the geographic positioning or location of tractor 324. The positioning of other components of tractor 324 as well as any attachments or implements being carried, pushed or pulled by tractor 324 may be defined in terms of this base link, the RAC 456 of tractor 324.

Battery 404 comprises a battery unit that is removably received within a corresponding chamber or cavity extending rearwardly from the front of chassis 400. Battery 404 mates with a corresponding connection interface for transferring electrical power from battery 404 to the electrically powered components of tractor 324. In other implementations, battery 404 may be located at other locations. In other implementations, battery 404 may be fixed and non-swappable or not removable. In the example illustrated, battery 404 electrically powers an electric motor or motors that drive rear wheels 450. In some implementations, wheels 450 of tractor 324 may alternatively be driven by an internal combustion engine and associated transmission or by a hybrid system using both a battery and an internal combustion engine.

Cab 406 comprises a compartment in which an operator may be seated when operating tractor 324. Cab 406 comprises a seat 460, a steering wheel 462, a control console 464 and a roof 466. Roof 620 extends over control seat 612 and control console 618. In some implementations, roof 466 may be raised and lowered.

GPS units 408 are supported by roof 466. As schematically illustrated, each of GPS units 408 comprises a GPS antenna 470 and an inertial measurement unit (IMU) 472 housed in a single enclosure or housing 473. In some implementations, each GPS unit 408 is a commercially available GPS unit sold as a single component, having a reduced overall cost as compared to individual GPS antenna and IMUs. Each of antenna 470 is similar to GPS antenna 32 described above. Each of IMUs 472 may be similar to IMUs 40 described above, Signals from IMUs 472 are transmitted to RAC location acquisition unit 328.

In the example illustrated, GPS unit 408-1 is located at a front end of roof 466, forward of rear axle 454 while GPS unit 408-2 is located at a rear end of roof 466, rearward of rear axle 454. Because tractor 324 comprises two offset spaced GPS units 408, GPS signal reception and GPS position estimates may be enhanced.

Camera units 410-1 and 410-2 are supported by roof 466 at a front and a rear of roof 466, facing in forward and rearward directions, respectively. Camera unit 410-1 is positioned forward of rear axle 454 while camera unit 410-2 is supported rearward of rear axle 454. As schematically illustrated, each of camera units 410 comprises a camera 474 and inertial measurement unit 476. In the example illustrated, each of camera units 410 integrate a camera and inertial measurement as a single integrated component contained within a single housing 477. In some implementations, each camera unit 410 is a commercially available camera unit sold as a single component, having a reduced overall cost as compared to individual cameras and IMUs.

Camera 474 of camera unit 410-1 captures video or images in front of tractor 324. Camera 474 of camera unit 410-2 captures video images towards a rear of tractor 324. In some implementation, camera 474 may comprise a stereo camera. In other implementations, camera 474 may comprise a monocular camera.

Inertial measurement units (IMUs) 476 of camera units 410 may be similar to inertial measurement units 40 described above. IMUs 476 output signals which may indicate or may be used to determine the roll and pitch of tractor 324 at the location of the individual IMUs. Signals from IMUs 476 are transmitted to RAC location acquisition unit 328.

IMUs 440 (schematically illustrated) are supported by roof 466 and provide inertial measurements at additional locations on roof 466. IMUs 440 may be similar to IMUs 40 described above. In the example illustrated, IMUs 440 are embedded within roof 466. Signals from IMUs 440 are transmitted to RAC location acquisition unit 328.

Front wheel encoders 442 comprise electronic devices that sense or measure the orientation of front wheels 452. In some implementations, front wheel encoders 442 may comprise potentiometers. Signals from front wheel encoders 442 are transmitted to RAC location acquisition unit 328.

Rear wheel encoders 444 (schematically shown) comprise electronic devices that sense or measure the rotational rate or speed of rear wheels 450. Signals from front wheel encoders 442 are transmitted to RAC location acquisition unit 328. In other implementations, other speed sensors may be used to detect the rotation of wheels 450 or the speed of tractor 324.

Steering actuator 446 comprises mechanical, hydraulic or electric actuator (pump etc.) configured to rotate front wheels 452 to effectuate steering of tractor 324. Steering actuator 446 receives steering commands or control signals from a processing unit of tractor 324. In some implementations, the processing unit may be part of RAC location acquisition unit 328. Forces from steering actuator 446 result in wheels 452 turning, wherein such turning is sensed by wheel encoder 442.

RAC location acquisition unit 328 is similar to RAC location acquisition unit 28 described above except that instruction 64 of medium 52 of RAC location acquisition unit 328 directs processing unit 50 to determine or estimates the current roll and pitch of tractor 324 based upon a combination of signals received from each of IMUs 472 of GPS units 408-1, 408-2, IMUS 476 of each of camera units 410-1 and 410-2 and both of IMUs 440-1, 440-2. In some implementations, the IMU signals are combined using a Kalman filter to determine roll and pitch estimates. In some implementations, the IMU signals are combined using an extended Kalman filter to determine roll and pitch estimates, Because a combination of signals from multiple IMUs are used to estimate roll and pitch, accurate roll and pitch estimates may be made using individual IMUS that may have a lower fidelity and that may be provided at a lower cost.

Further reducing the overall cost of system 320, many of the IMUs used to determine roll and pitch estimates are already existing as part of the GPS units 408 and camera units 410. By taking advantage of the existing IMUs (albeit possibly lower fidelity IMUs) in the GPS units 408 and the camera units 410 to estimate roll and pitch, a greater number of IMUs are available to provide enhanced accuracy while reducing cost. Although system 320 is illustrated as estimating roll and pitch using a combination of signals from six IMUs supported by roof 466, in other implementations, system 320 may utilize a fewer number of IMUs to estimate roll and pitch, such as where one or both of IMUs 440 are omitted, such as where one or both of IMUs 472 are omitted such as where one or both of IMUs 476 are omitted. In implementations, system 320 may include even additional IMUs, wherein such additional signals will be combined with signals from other IMUs for estimating roll and pitch.

As described above with respect to method 100, RAC location acquisition unit 328 comprises medium 52 having instruction 60, 62 and 64. Such instructions 60 direct processing unit 50 to acquire GPS signals from both of antennas 70 of GPS units 408. Such instructions 62 direct processing unit 50 to acquire IMU signals from each of the six IMUs. Instructions 64 direct processing unit 50 to determine or estimate the geographic location of RAC 456 based upon a the geographic antennas 470 (as determined by a GPS receiver from the received GPS signals), the offsets from each of the antennas 470 to RAC 456, the current yaw or orientation of tractor 324 (as determined from wheel encoders 442 or from steering control signals transmitted to steering actuator 446) and the roll and pitch corrections as determined from the combination of signals from the six IMUs.

Figures 9, 10:
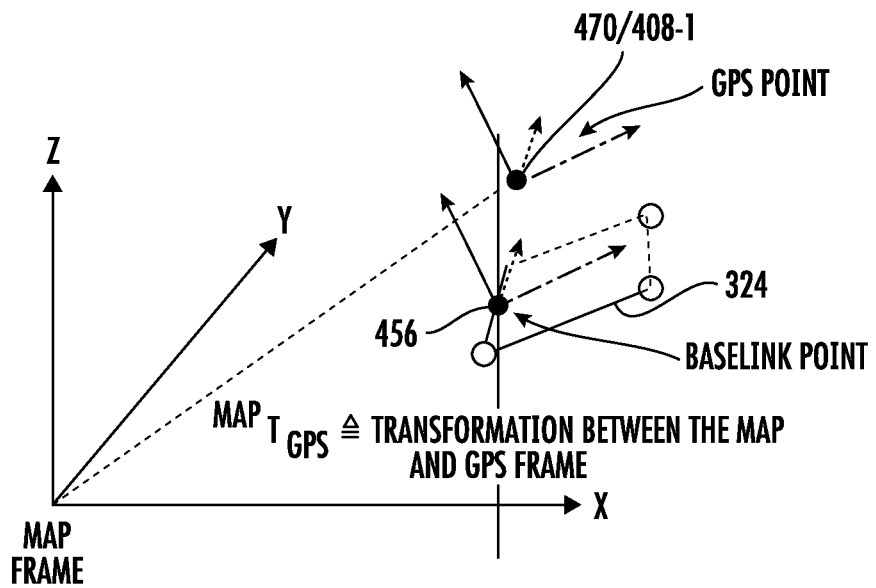
FIG. 9 is a diagram illustrating transformation of a GPS point to a base link location.
FIG. 10 illustrates a 4×4 transformation matrix from the GPS frame to the map frame.

In some implementations, the RAC location additionally includes a heading of the vehicle RAC and is determined by unit 328 as follows. FIG. 9 illustrates tractor 324 and its base link, RAC 456 in an example location in a map frame which may be defined in terms of latitude and longitude. FIG. 9 further illustrates a GPS point, the location of one of the GPS antenna of tractor 324. In the example illustrated, the GPS point may refer to the geographic location of the GPS antenna 470 of GPS unit 408-1.

The determination of the geographic location or position of the base link, the RAC 456 may utilize a simple matrix multiplication of the base link point in the GPS frame and a 4×4 transformation matrix from the GPS frame to the map frame as follows:

$$P^{map}_{baselink} = T^{map}_{gps} \cdot P^{gps}_{baselink}$$

wherein:

$P^{gps}_{baselink}$: link The position of the baselink in the gps frame (this is a fixed position on the tractor that never moves).

$T^{map}_{gps}$: The gps and imu's provide the 4×4 homogeneous transformation matrix from the gps frame to the map frame (shown in 10). This transformation matrix consists of a rotation matrix and the translated position of the gps in the map frame.

The 3×3 rotation matrix R describes the roll, pitch, and yaw of the tractor $R = RzRyRx$, wherein $Rz$ = rotation about the $z$ axis (yaw), $Ry$ = rotation about the $y$ axis (pitch), and $Rx$ = rotation about the $x$ axis (roll)

The yaw (heading) of the tractor is measured by comparing the position of the front and rear gps antennas (470 of GPS units 408-1 and 408-2) of the tractor 324. The pitch may be determined by the relative position of the front and rear gps antennas and is supplemented with data from the inertial measurement units mounted on the vehicle body. The roll of the tractor can only be calculated from the IMU given the mounting of the rear and front gps on the body.

If only acceleration from gravity is present, the roll and pitch angles can be calculated from the measured acceleration values ax, ay, az.

$$\text{roll} = \arctan\left(\frac{ay}{\sqrt{ax^2 + az^2}}\right)$$

$$\text{pitch} = \arctan\left(\frac{a_x}{\sqrt{ay^2 + az^2}}\right)$$

As described above, the 3×3 rotation matrix R may be the result of the fusion of measurements provided by the multiple IMUs of tractor 324: IMUs 472 of GPS units 408, IMUs 476 of camera units 477 and IMUs 440, The measurements provided by the multiple IMUs may be fused using a Kalman filter, such as an extended Kalman filter. In other implementation, the measurements provided by the multiple IMUs may be fused using other filters, such as other forms of Kalman filters or other data fusion algorithms or techniques.

In some implementations, RAC location acquisition unit 328 may carry out method 200 described above. In response to insufficient or unreliable GPS signals (as indicated by block 222 in FIG. 4), unit 328 may determine or estimate the RAC location using a prior RAC estimate, wheel rotation data acquired from wheel encoders 444 and steering data acquired from wheel encoders 442.

Once the geographic location of RAC 456 has been, it may be used to output control signals to steering actuator 446 to control future movement of tractor 324. The location of RAC 456 may also be utilized by control circuitry associated with tractor 324 to control the positioning and/or operation of various attachments or implements being carried, pushed or towed by tractor 324. In implementations where cameras or other sensors are used to detect plants or conditions adjacent to tractor 324 while tractor 324 is traversing a field, orchard of the like, the current positioning of RAC 456 may be associated with the concurrently detected plant conditions, field conditions or the like to generate maps linking different detected plant, field orchard characteristics to different geographic locations.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A rear axle center locating system comprising:
a tractor comprising:
   a rear axle having a center;
   a global positioning system (GPS) antenna offset from the rear axle;
   inertial measurement units; and
a position acquisition unit comprising:
   a processing unit; and
   a non-transitory computer-readable medium containing instructions to direct the processing unit to:
      determine a geographic location of the GPS antenna based upon signals received by the GPS antenna; and
      determine a geographic location of the center of the rear axle based upon the geographic location of the GPS antenna and combined data from the inertial measurement units.

2. The rear axle center locating system of claim 1, wherein the instructions are to direct the processing unit to determine a roll and pitch of the tractor based upon the combined data from the inertial measurement units and to determine the geographic location of the center of the rear axle based upon the geographic location of the GPS antenna and the determined roll and pitch.

3. The rear axle center locating system of claim 1 further comprising a wheel encoder to output signals indicating rotation and yaw of wheels of the tractor, wherein the instructions are to direct the processing unit to determine the geographic location of the center of the rear axle based upon a prior geographic location of the center of the rear axle and the signals indicating rotation and yaw of the wheels of the tractor.

4. The rear axle center locating system of claim 1, wherein the tractor comprises a roof and wherein the inertial measurement units are supported by the roof.

5. The rear axle center locating system of claim 4 further comprising a camera supported by the roof, wherein one of the inertial measurement units is part of the camera.

6. The rear axle center locating system of claim 5 further comprising a GPS unit supported by the roof, wherein the GPS unit comprises both the GPS antenna and another of the inertial measurement units.

7. The rear axle center locating system of claim 4 further comprising a GPS unit supported by the roof, wherein the GPS unit comprises both the GPS antenna and one of the inertial measurement units.

8. The rear axle center locating system of claim 1, wherein the instructions are to direct the processing unit to combine the data from the inertial measurement units using a Kalman filter.

9. The rear axle center locating system of claim 1 further comprising:
wheels; and
an actuator to adjust steering of the wheels, wherein the instructions are to direct the processing unit to output control signals to the actuator to adjust the steering of the wheels based upon the determined geographic location of the center of the rear axle.

10. The rear axle center locating system of claim 1, wherein the non-transitory computer-readable medium and the processing unit are carried by the tractor.

11. A non-transitory computer-readable medium containing instructions, which when executed by a processor, cause the processor to:
acquire GPS signals indicating a position of a GPS antenna offset from a center of a rear axle of a tractor;
acquire signals from multiple inertial measurement units;
determine a geographic location of the center of the rear axle of the tractor based upon the position of the GPS antenna and the signals from a combination of the multiple inertial measurement units; and
adjust steering of wheels of the tractor based upon the determined geographic location of the center of the rear axle.

12. The medium of claim 11, wherein the instructions which when executed by the processor, cause the processor to determine a roll and pitch of the tractor based upon the signals from a combination of the multiple inertial measurement units and to determine the geographic location of the center of the rear axle of the tractor based upon the position of the GPS antenna and the determined roll and pitch of the tractor.

13. The medium of claim 11, wherein the instructions which when executed by the processor, cause the processor to to determine the geographic location of the center of the rear axle based upon a prior geographic location of the center the rear axle and the signals indicating rotation and yaw of wheels of the tractor.

14. The medium of claim 11, wherein the tractor comprises a roof and wherein the inertial measurement units are supported by the roof.

15. The medium of claim 14 further comprising a camera supported by the roof, wherein one of the inertial measurement units is part of the camera.

16. The medium of claim 15 further comprising a GPS unit supported by the roof, wherein the GPS unit comprises both the GPS antenna and another of the inertial measurement units.

17. The medium of claim 14 further comprising a GPS unit supported by the roof, wherein the GPS unit comprises both the GPS antenna and one of the inertial measurement units.

18. The medium of claim 11, wherein the instructions are to direct the processing unit to combine the data from the inertial measurement units using a Kalman filter.

19. A method comprising:
acquiring GPS signals indicating a position of a GPS antenna offset from a center of a rear axle of a tractor;
acquiring signals from multiple inertial measurement units;
determining a geographic location of the center of the rear axle of the tractor based upon the position of the GPS antenna and the signals from a combination of the multiple inertial measurement units; and
adjusting the steering of wheels of the tractor is based upon the determined geographic location of the center of the rear axle.

* * * * *